United States Patent [19]

Brosnan et al.

[11] Patent Number: 4,740,675
[45] Date of Patent: Apr. 26, 1988

[54] DIGITAL BAR CODE SLOT READER WITH THRESHOLD COMPARISON OF THE DIFFERENTIATED BAR CODE SIGNAL

[75] Inventors: Michael Brosnan, Fremont; Ronald Quan, Cupertino, both of Calif.

[73] Assignee: Hewlett-Packard Company, Palo Alto, Calif.

[21] Appl. No.: 850,311

[22] Filed: Apr. 10, 1986

[51] Int. Cl.⁴ .......................... G06K 9/18; G06K 7/10
[52] U.S. Cl. .................................. 235/462; 235/436; 235/466; 235/463; 250/568
[58] Field of Search ............... 235/462, 463, 466, 436, 235/437, 472, 482; 250/555, 566, 568, 569; 382/12

[56] References Cited

U.S. PATENT DOCUMENTS

| | | | |
|---|---|---|---|
| 3,700,858 | 10/1972 | Murthy | 235/472 |
| 3,761,725 | 9/1973 | Meyer | 250/566 |
| 3,892,949 | 7/1975 | Dodson | 235/462 |
| 3,909,594 | 9/1975 | Allais et al. | 235/462 |
| 3,993,894 | 11/1976 | Walker | 235/466 |
| 4,000,397 | 12/1976 | Hebert et al. | 235/462 |
| 4,158,435 | 6/1979 | Nakanishi et al. | 235/463 |
| 4,219,152 | 8/1980 | Couch et al. | 235/463 |
| 4,335,301 | 6/1982 | Palmer et al. | 235/462 |

Primary Examiner—Raymond F. Cardillo
Assistant Examiner—Robert A. Weinhardt
Attorney, Agent, or Firm—James M. Williams

[57] ABSTRACT

A digital bar code slot reader provides low first bar error rates and a wide scan speed range for bar codes on laminated badges and tags, and is also capable of reading bar codes on paper. The reflectance waveform from the bar code is differentiated in order to find the regions of high slope. The differentiated signal is peak detected to find the amplitude of the slope occurring at the initial card edge. This peak detected value is used to generate thresholds to be compared to the differentiated reflectance signal during the rest of the scan. When the slope of the reflectance signal is above the positive threshold or below the negative threshold, a switching signal is produced. To compensate for the lower amplitude output of the differentiator at low scan speeds, one of the amplifiers in the circuit produces a higher gain at low frequencies than at high frequencies.

4 Claims, 5 Drawing Sheets

DIGITAL BAR CODE SLOT READER WITH THRESHOLD COMPARISON OF THE DIFFERENTIATED BAR CODE SIGNAL

BACKGROUND AND SUMMARY OF INVENTION

This invention relates generally to slot readers for optical bar codes and in particular to a slot reader adapted for reading bar codes on laminated plastic cards and badges. The digital bar code slot reader is a highy effective alternative to key board data entry. Bar code scanning is faster and more accurate than key entry and provides far greater throughput. In addition, bar code scanning typically has a higher first read rate and greater data accuracy than optical character recognition. When compared to magnetic strip encoding, bar code offers significant advantages in flexibility of media, symbol placement and immunity to electromagnetic fields.

However, several problems arise with digital bar code slot readers. One problem is caused by plastic laminations on the cards or badges which are scanned through the slot reader. The plastic lamination can cause extra reflections and light piping which reduce the contrast and distort the shape of the reflectance waveform from the bar code. This shape change can cause the scanner not to read the bar code. Another problem arises because the card or badge is manually pulled through the slot reader. The variations in pull speed cause scan rate variations up to several orders of magnitude. Again, these variations can cause misreading of the bar code.

Past efforts to cope with these problems have not been entirely successful. The problems encountered in digitizing a bar code read from a laminated card or badge can be more easily understood by referring to FIG. 6 which illustrates a reflectance signal waveform from a typical bar code scan of a laminated badge or card. The scan begins at the left end of the figure and moves towards the right end. At the start of the scan there is a smooth high voltage plateau which indicates the reflectance from white area of the card. As the scan moves close to the bar code area, the reflectance and voltage level begin to drop off. Next, the scan moves into the bar code producing a series of low voltage valleys corresponding to the black bars of the oar code and high voltage peaks corresponding to the white spaces between the bars. It can be seen from the waveform that the height of the peaks is significantly lower than the initial reflectance plateau, due to the distortion and light piping effects.

In order to process the bar code information with digital circuitry, the analog scan signal must be digitized, the varying peaks and valleys must be converted into digital pulses of uniform amplitude, and pulse widths that represent the widths of the bars and spaces. One way to determine the transition from high reflectance white spaces to low reflectance black bars is to set a switching threshold at a fixed voltage level between the white reflectance level 101 and the black reflectance level 102, as illustrated by tne dashed line 103 in FIG. 6. While this method may be adapted for reading bar codes on a particular medium, it does not have the flexibility to read bar codes on a variety of media. As FIG. 6 shows, if the threshold is set at a level appropriate for one reflectance level, e.g., line 103, it does not work for bar codes on laminated media where the the peak levels of reflectance change. If the switching threshold is set low enough to suit the laminate signal waveform, it will not work properly with the paper waveform.

A second method for digitizing bar code reflectance signals attempts to compensate for changing peak reflectance levels by using peak detectors and an adaptive threshold level. The operation of this method is illustrated in the broken line 105 in FIG. 6. A peak detector senses the level of the white reflectance peaks and adjusts the switching threshold to a fraction, for example one-half, of the difference between the high voltage peaks and the low voltage valleys. This method works effectively for paper bar code tags with a wide variety of reflectance and contrast. The difficulty with this method is its response rate. If the response rate is set fast enough to handle very high speed scans, during a low speed scan the peak level is constantly adjusted before the peaks can register. If a compromise response rate is adopted, the first several bars in the bar code can be missed before the threshold adapts to the proper peak level. This difficulty is particularly apparent in digitizing bar codes on laminated media, as shown by the example in FIG. 6.

A third method, commonly referred to as a delta detector, does not use a threshold for switching but switches on any change of signal level greater than a certain amount either up or down. Although this method performs fairly well at detecting the peaks and valleys of a bar code in a laminated card, it also has difficulties. In particular, the roll-off at the beginning of the bar code causes an extreme widening of the first bar. In addition, choosing the magnitude of delta for switching makes it difficult to adapt this type of detector for both paper and laminate, as well as to both high and low contrast bar codes. Finally, this method is not particularly accurate in determining edge location.

Another method for digitizing bar code reflectance signals, described in U.S. Pat. No. 4,000,397, determines transitions by detecting zero crossings of the second derivitive of the reflectance signal, at selected gating times. The gating times occur when the first derivitive exceeds a threshold based on the peak level of the reflectance signal. This method works for a reader with a fairly constant scan speed, such as a noncontact moving beam scanner, but has difficulties when the scan speed varies significantly as it does with a slot reader. At slow scan speeds, the amplitude of the first derivitive can become lower than the threshold level and the gating signal will not trigger properly.

Yet another method uses a high pass filter on the waveform signal before performing bar code digitizing. The frequency range of the bar code data is in the pass band of the filter, but the roll-off is below the pass band. This helps to eliminate the spurious roll-off signal but limits the low speed scan sensitivity, thus reducing the effective range of scan speeds that the slot reader can handle.

According to the invention, a digital bar code slot reader provides low first bar error rates and a wide scan speed range for bar codes on laminated badges and tags, and is also capable of reading bar codes on paper. The reflectance waveform from the bar code is differentiated in order to find the regions of high slope. The differentiated signal is peak detected to find the amplitude of the slope occurring at the initial card edge. This peak detected value is used to generate thresholds to be compared to the differentiated reflectance signal during the rest of the scan. When the slope of the reflectance signal is above the positive threshold or below the negative threshold, a switching signal is produced.

In the past, although differentiation has seemed a promising method for producing a digitized output for a bar code scanner, the large variations in peak amplitudes of the differentiated signals caused by variations in scan speed prevented an effective solution. According to the invention, this problem can be overcome by using a differential amplifier which compensates for the low peak values from slowly scanned bar codes and by using a peak detector with a relatively long time constant to set a threshold voltage for the scan proportional to the peak generated when the edge of the card or badge crosses the scanning optics photodetector.

At low scan speeds, the amplitude of the differentiator output is much lower than at high scan speeds. To compensate for this, one of the amplifiers in the circuit produces a higher gain at low frequencies. This reader works over a wide scan speed range (from 4–150 inches per second for 7.5 mil resolution), a wide range of contrasts (33% to 100%), and accurately preserves the width of bars and spaces, including the first bar, even with waveforms in which the narrow elements do not have full peak to peak signal swing.

DETAILED DESCRIPTION OF THE INVENTION

Figure 1:
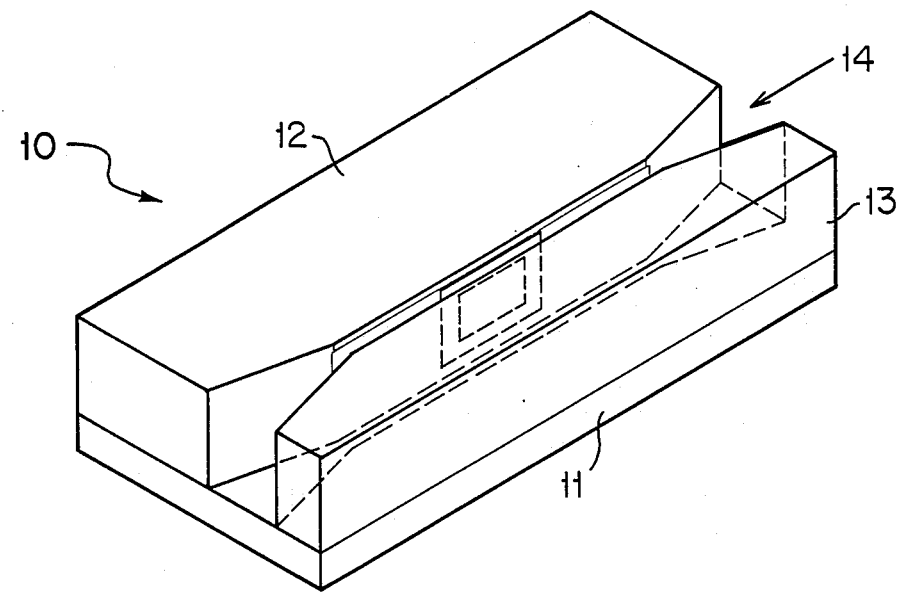
FIG. 1 shows an outline view of the slot reader constructed in accordance with the teaching of the invention.

The physical structure of the preferred embodiment of the slot reader of the invention is shown in FIG. 1. The optics and electronics are housed in module 12. This module is mounted on base plate 11 and can be fully gasketed and sealed to provide for operation suitable in outdoor or wet environments. A rail 13 also mounted to base 11 define the slot track 14 through which a badge or card is drawn for scanning through window 15. Window 15 is centered in the slot track 14 allowing the user to easily scan from either direction. The wide slot width at either end of track 14 makes it easier to insert and slide the cards for scanning.

Figure 2:
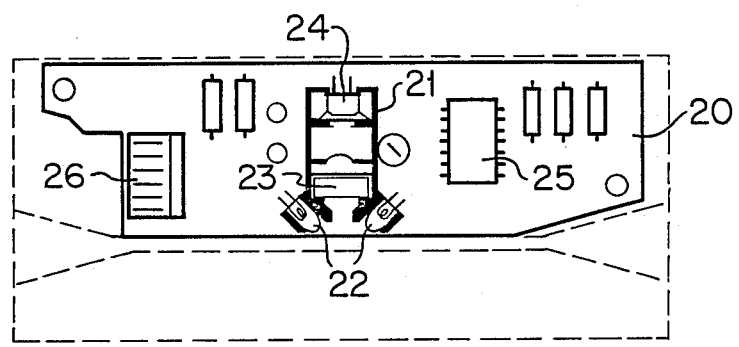
FIG. 2 shows a simplified outline drawing of some of the components of the slot reader.

FIG. 2 shows a schematic layout of some of the major optical and electronic components of module 12. Mounted on PC board 20 are optical module 21, electronics module 25 and output plug 26. Optics module 21, mounted behind window 15, comprises light sources 22 for illuminating the bar code, photodetector 24, and lens 23 for focusing the light reflected from the bar code on photodetector 24. Photodetector 24 produces an electronic signal proportional to the amount of light reflected from the bar code. Electronics module 25 may comprise one or more integrated circuits 25 and other discrete components necessary to process the signal from photodetector 24 to produce a digital output. Input/output plug 26 connects the bar code reader to a suitable power supply and to a data processing means for collecting or analyzing the data scanned in from the bar code on the card or badge.

Figure 3:
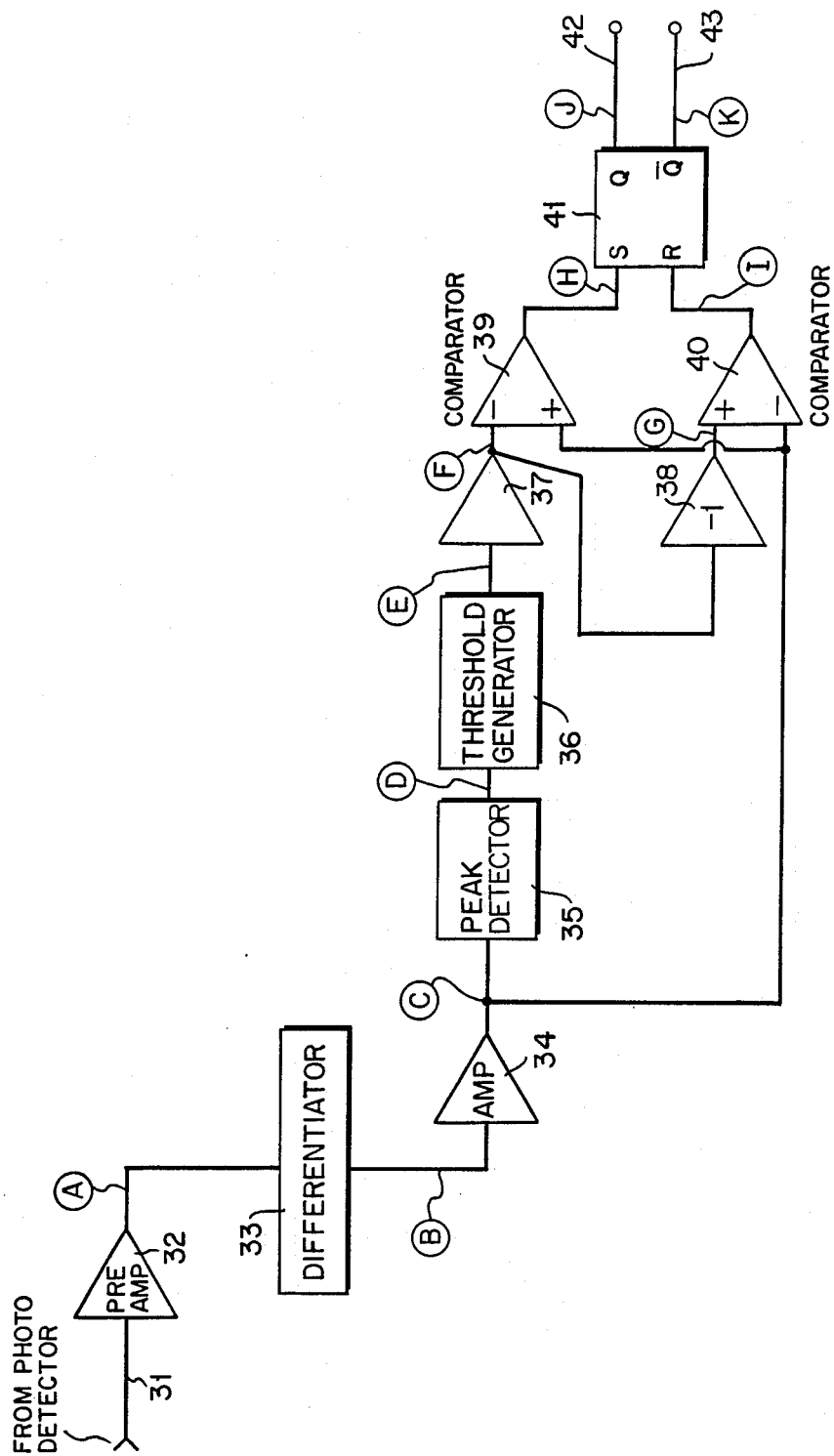
FIG. 3 is a schematic block diagram of a slot reader constructed in accordance with the teaching of the invention.
Figure 4:
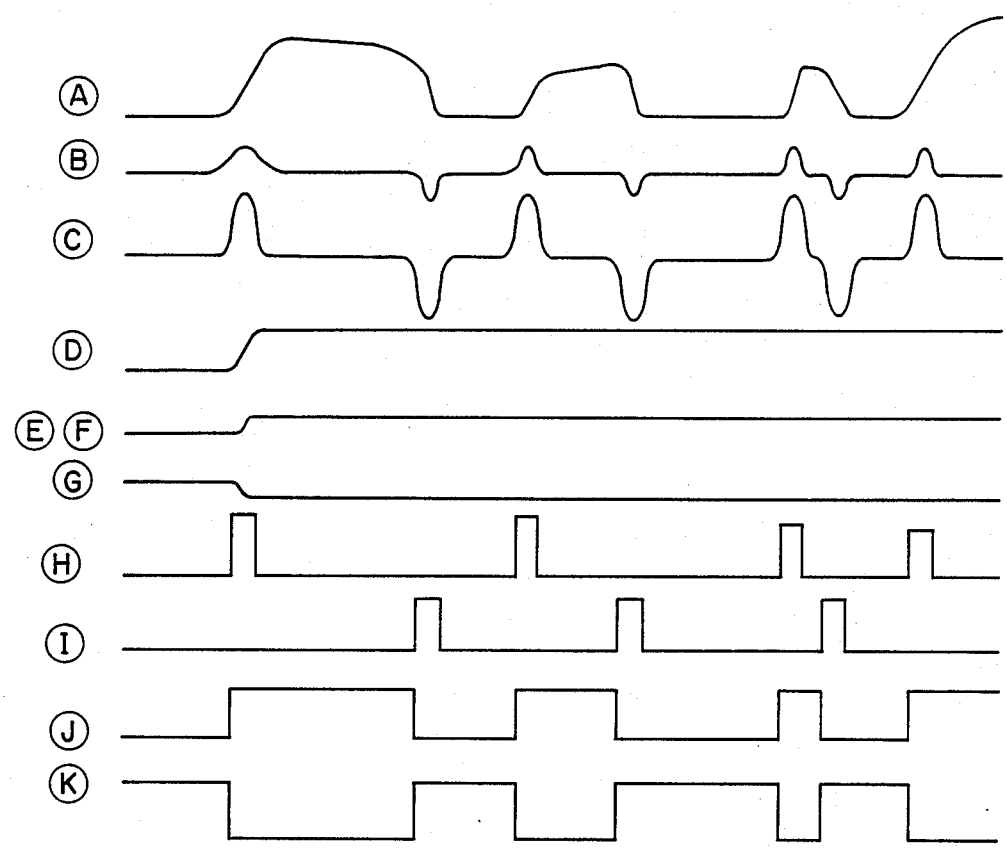
FIG. 4 illustrates the waveforms at selected points in the circuit shown in FIG. 3 during a bar code scan.

A schematic block diagram of the electronic circuit contained in electronics module 25 which digitizes the signal received from photodetector 24 is shown in FIG. 3. The input signal from the photodetector on input line 31 is amplified by pre-amp 32. The pre-amp 32 is a high gain transimpedance amplifier with a bandwidth of 15 KHz. It is important that the pre-amp be a low noise amplifier. The pre-amplified signal is applied to differentiator 33. The differentiator 33 produces an output signal whose amplitude corresponds to the slope of the input signal, with peaks in the high positive or negative slope regions of the input waveform. The differentiated signal is then amplified by amplifier 34. The waveforms which occur during a typical scan at the outputs of pre-amp 32, differentiator 33, and amplifier 34 are illustrated in FIG. 4. As discussed below, amplifier 34 has higher gain at low frequencies than at high frequencies in order to improve the performance of the bar code resader for slow scan speeds.

The output signal from amplifier 34 is used to create threshold detection levels to be applied to positive and negative comparators 39 and 40. The output of amplifier 34 is also used as the signal input to be compared to the threshold levels by comparators 39 and 40.

In order to produce the threshold levels, the output of amplifier 34 is applied to peak detector 35 to find positive peak values of the output of amplifier 34. These peaks occur at regions of high positive slope of the input reflectance waveform, that is, black to white transitions. Based on the output of the peak detector 35, switching thresholds are set that are appropriate for the amplitude of the input signal. Under normal circumstances, the first peak corresponds to the card edge passing window 15 and optics module 21. Using this peak to set the comparator thresholds effectively calibrates the reader for the scanning speed. It also sets the thresholds so that low contrast changes in the margin of the badge are ignored and yet actual bar code signals will be digitized. For example, a relatively fast scanning rate will produce a relatively large initial peak and a high switching threshold. On the other hand, a slow scan rate will produce a smaller initial peak and a corresponding lower switching threshold. The peak detector has a decay time of 100 milliseconds which is a good compromise between holding a stable switching threshold value during the entire scan at low scan speeds and being ready for a lower contrast tag to be scanned soon after a high contrast tag has been scanned.

The output of peak detector 35 is applied to threshold generator 36 which multiplies the output of the peak detector by 0.3 to create the positive switching threshold voltage level. Threshold generator 36 may comprise a resistor voltage divider network or other suitable means for performing a voltage division function. The 0.3 factor has been found to be a good compromise between two conflicting considerations. On the one hand, it is important to detect only the regions of high slope. This would tend to favor using a value very close to the detected peak, i.e. a multiplier of 1.0 to establish the threshold. On the other hand, not all transitions will have the same amplitude because of scanning speed changes, low contrast bar codes on high reflectance white paper, or limited resolution of bars at high scan speeds. In order to insure that these transitions will not be missed, the threshold should be fairly low, i.e. a low multiplication factor. Choosing 0.3 allows a good safety margin for reading fairly low contrast tags on high reflectivity white backgrounds while providing sufficient noise rejection.

Because the threshold generator comprises high value resistors, it cannot drive much of a load directly. Therefore, buffer 37 is used as a non-inverting voltage follower for the output of threshold generator 36, to provide a suitable threshold input for positive threshold comparator 39. Comparator 39 identifies positive slope transitions. The output of buffer 37 is applied to the negative input of comparator 39 and the output of amplifier 34 is applied to the positive input of comparator 39. Thus, when the output signal of amplifier 34 goes above the positive threshold, the output from comparator 39 will go high indicating the beginning of a space.

Since the output of amplifier 34 is the differentiated input signal, it can go both above and below the reference voltage. An excursion above the reference voltage indicates a positive slope region, while an excursion below the reference voltage indicates a negative slope region.

In order to identify negative slope transitions, a second comparator, negative threshold comparator 40, is required. The threshold input for comparator 40 is produced by negative buffer 38 which inverts the threshold voltage output from buffer 37. The output of buffer 38 is applied to the positive input of comparator 40 while the output of amplifier 34 is applied to the negative input of comparator 40. Thus, when the output of amplifies 34 goes below the negative threshold, the output of amplifier 40 goes high indicating the beginning of a bar.

The outputs from comparators 39 and 40 are applied respectively to the set and reset inputs of flip-flop 41. When a space begins, flip-flop 41 is set by the positive going output from comparator 39. When a bar begins, flipflop 41 is reset by the positive going output from comparator 40. Thus, the Q output of flip-flop 41 is high during a space and low during a bar. If a negative logic output is preferred, the Q bar output of flip-flop 41 may be used. The Q bar output is high for a bar and low for a space.

The operation of the circuit shown in FIG. 3 can be more clearly understood by referring to FIG. 4 which illustrates the waveforms present at various locations in the circuit during a typical scan. In FIG. 4, the letters to the left of each waveform correspond to the letters at the points in the circuit in FIG. 3 where the waveform is measured. For example, waveform A occurs at the output of pre-amplifier 32, waveform C occurs at the output of amplifier 34, waveform H occurs at the output of positive threshold comparator 39 and waveform J occurs at the Q output 42 of flip flop 41. The scan begins at the left hand side of FIG. 4 and moves toward the right hand side.

Waveform A shows the amplified input signal from photodiode 24. The signal begins low and then makes a positive excursion as the edge of the card being scanned passes the optics module 21. A relatively high signal level follows this first positive excursion indicating the high reflectance of the card. Note that near the end of this high plateau there is a roll-off as the light piping and scattering effects caused by the bar code begin to affect the reflectance. The first bar of the bar code causes a negative transition and this is followed by positive and negative transitions as the succeeding spaces and bars of the bar code are scanned. At the end of the scan, the signal moves back to another long high reflectance plateau indicating the high reflectance of the card after the bar code.

Waveform B shows the differentiated reflectance signal. The first transition causes a relatively large peak and the following transitions alternate below and above the reference voltage and are somewhat smaller peaks. Waveform C is the amplified differentiated signal.

Waveform D shows the output of peak detector 35. Note that because of the relatively long time constant of the peak detector, only the first peak has a significant effect on setting the threshold. Subsequent peaks have at most a relatively minor effect.

Waveform E shows the output of threshold generator 36, after the output of the peak detector is multiplied by 0.3. Waveform F, the output of buffer 37, is the same as waveform E.

Waveform G shows the output of negative buffer 38 inverting the threshold so that it can be used as a negative threshold in comparator 40.

The operation of the comparators is shown by waveforms H and I. Positive threshold comparator 39 compares the positive threshold signal F and the amplified differentiated reflectance waveform C. Each time a positive peak in waveform C rises above the positive threshold shown in waveform E, comparator 39 produces a positive output as indicated by waveform H. Similarily, negative threshold comparator 40 produces a positive output each time a negative peak in waveform C goes below the negative threshold shown in waveform G.

Waveforms J and K show the complementary digital logic outputs of output flip flop 41. Waveform J shows the positive output logic 42. Waveform J is high during a space and low during a bar. A comparison of waveform J to waveform A shows the correspondence of the output digital waveform of the circuit to the input analog waveform. Waveform K is simply the Q bar complementary logic output of flip-flop 41.

As noted above, a rapid scan will provide a relatively rapid rise in the input signal and thus a fairly large peak in the differentiated signal. However, a slow scan will provide only a slow rise in the input signal and fairly small peak in the differentiated signal. The variations in size of the peaks in the differentiated signals from scanning the very same bar code can cause problems in setting the proper threshold and in accurately recognizing the beginning of a space or a bar.

One aspect of this problem is solved by using the initial peak in the scan to set the value of the switching thresholds with peak detector 35 and threshold generator 36. Thus, for a slow scan, the initial peak which results as the edge of the card passes the optics module 21 will be relatively small, and thus the thresholds will be set correspondingly low.

Amplifier 34 also contributes to solving this problem and to expanding the useful range of scanning speeds which the slot reader can handle. Amplifier 34 receives signals from differentiator 33 and amplifies them to levels suited to the operating range of comparators 39 and 40. In order to compensate for the relatively small peaks at low scanning speeds compared to the relatively high peaks at higher scanning speeds, the amplifier has a higher gain at low frequencies and lower gain at the high frequencies. The gain of amplifier 34 can also be adjusted to compensate for sensor output variation.

Figure 5:
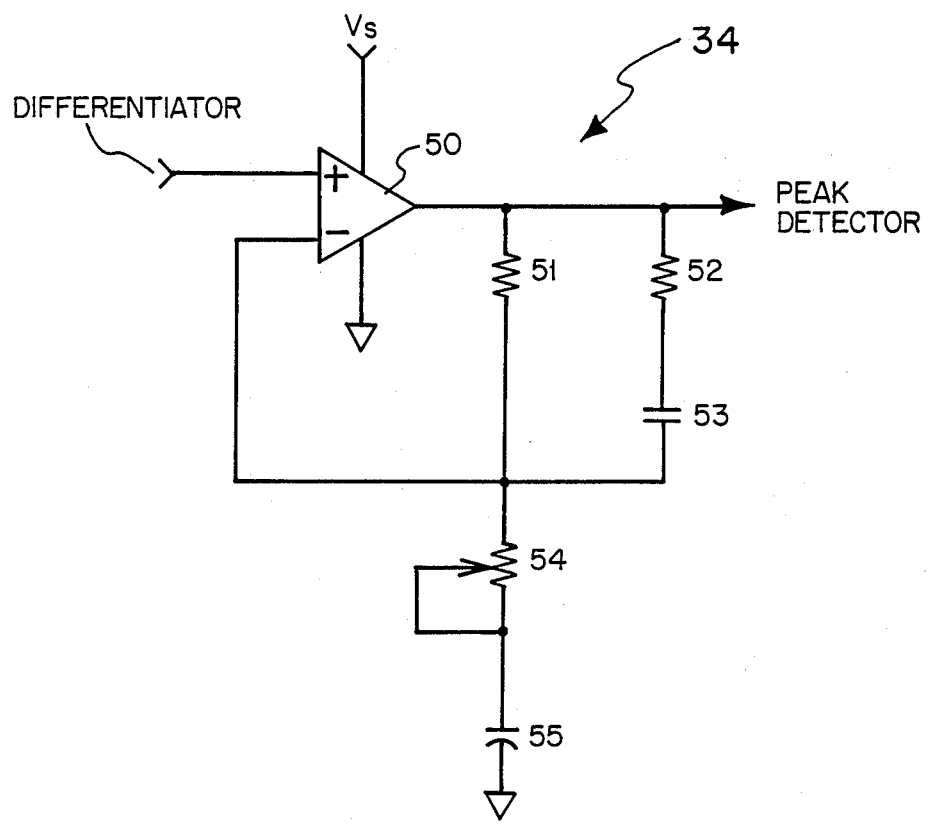
FIG. 5 is a schematic diagram of amplifier 34 shown in FIG. 3.
Figure 6:
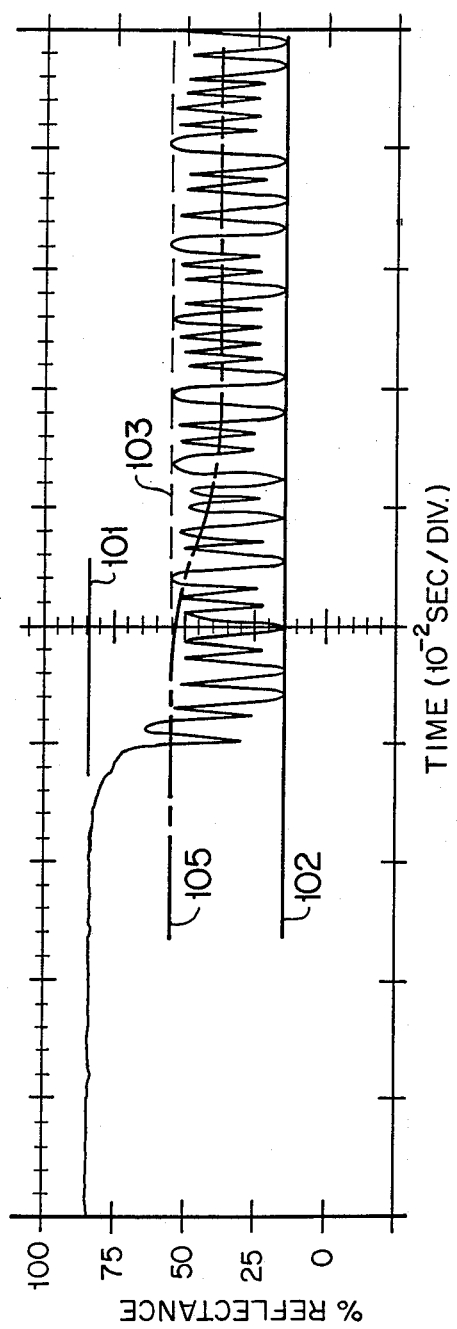
FIG. 6 shows a waveform during a bar code scan of a laminated card or badge, illustrating various methods of decoding the waveform.

The schematic circuit diagram for the preferred embodiment of amplifier 34 is shown in FIG. 5. The output from differentiator 33 is applied to the positive input of operationan amplifier 50. The gain of amplifier 50 is set by the feedback loop comprised of resistors 51, 52 and 54. At low frequencies capacitor 53 presents an open circuit so that resistor 52 is not part of the feedback loop, and the gain is the ratio of resistor 51 to variable resistor 54. Capacitor 55 prevents amplification of the DC offset voltage of amplifier 50 but since it and variable resistor 54 roll-off off around 1 Hz, it does not affect the gain in the 100 Hz to 10 KHz range where the signal will be found. At higher frequencies, capacitor 53 becomes a short so that the effective resistance in the top part of the voltage divider is resistor 51 in parallel with resistor 52. Resistor 52 has lower resistance than resistor 51 so that the effective resistance becomes smaller and the gain, which is the ratio of the parallel resistors to variable resistor 54, also becomes smaller. For example, if resistor 51 is 10 megaohms, resistor 52 is 3.3 megaohms, resistor 54 is set to 50 kiloohms, capacitor 53 is 47 picofarads and capacitor 55 is 4.7 microfarads, the low frequency gain, below 250 Hz, is about 200, and the high frequency gain, above 1000 Hz, is about 50. The gain can be adjusted by changing the resistance of variable resistor 54.

What is claimed is:

1. Apparatus for digitizing a reflectance signal obtained from scanning a bar code, comprising:
    a differentiator responsive to the reflectance signal from the bar code to produce a first signal proportional to the slope of the reflectance signal;
    a peak detector responsive to the first signal to produce a second signal proportional to the peak amplitude of the first signal;
    means for inverting the second signal to produce a third signal;
    a positive threshold comparator responsive to the first signal and to the second signal to produce a first digital output signal when the amplitude of the first signal goes above the amplitude of the second signal;
    a negative threshold comparator responsive to the first signal and to the third signal to produce a second digital output signal when the amplitude of the first signal goes below the amplitude of the third signal; and
    means for combining the first and second digital output signals to produce a third digital output signal corresponding to the input reflectance signal.

2. The apparatus of claim 1 further comprising an amplifier connected between the differentiator and the peak detector for amplifying said first signal, said amplifier having higher gain for low frequency signals than for high frequency signals.

3. A method for digitizing a reflectance signal obtained from scanning a bar code, comprising the following steps:
    differentiating the reflectance signal from the bar code to produce a first signal proportional to the slope of the reflectance signal;
    peak detecting the first signal to produce a second signal proportional to the peak amplitude of the first signal;
    inverting the second signal to produce a third signal;
    comparing the amplitude of the first signal to the amplitude of the second signal and producing a first digital output signal when the amplitude of the first signal goes above the amplitude of the second signal;
    comparing the amplitude of the first signal to the amplitude of the third signal and producing a second digital output signal when the amplitude of the first signal goes below the amplitude of the third signal; and
    combining the first and second digital output signals to produce a third digital output signal corresponding to the input reflectance signal.

4. The method of claim 1 further comprising the step of amplifying said first signal before the peak detecting step is performed, wherein the amplifying is done by an amplifier having higher gain for low frequency signals than for high frequency signals.

* * * * *